(12) United States Patent
Koster et al.

(10) Patent No.: US 7,441,574 B2
(45) Date of Patent: Oct. 28, 2008

US007441574B2

(54) PNEUMATIC TIRE

(75) Inventors: Georges Koster, Steinfort (LU); Claude Ernest Felix Boes, Erpeldange (LU); Rene Jean Zimmer, Howald (LU); Hans-Bernd Fuchs, Konz (DE); Fahri Ozel, Eischen (LU); Wolfgang Albert Lauer, Mersch (LU); Lothar Braun, Bollendorf (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 257 days.

(21) Appl. No.: 11/505,960

(22) Filed: Aug. 17, 2006

(65) Prior Publication Data

US 2008/0045678 A1    Feb. 21, 2008

(51) Int. Cl.
    *B60C 27/00*    (2006.01)
(52) U.S. Cl. ............... 152/209.5; 152/525; 524/81; 524/571; 524/573; 524/574; 524/575; 524/575.5
(58) Field of Classification Search ............ 152/209.5, 152/525; 524/81, 571, 573, 574, 575, 575.5
    See application file for complete search history.

(56) References Cited

U.S. PATENT DOCUMENTS

| | | | |
|---|---|---|---|
| 4,429,085 A | 1/1984 | Henderson et al. | 526/92 |
| 4,895,884 A | 1/1990 | Benko et al. | 523/207 |
| 5,648,508 A * | 7/1997 | Yaghi | 556/9 |
| 6,355,793 B1 * | 3/2002 | Lin | 540/145 |
| 6,486,099 B2 | 11/2002 | Igari et al. | 504/359 |
| 6,830,822 B2 | 12/2004 | Yadav | 428/552 |
| 6,893,564 B2 * | 5/2005 | Mueller et al. | 210/502.1 |
| 6,930,193 B2 | 8/2005 | Yaghi et al. | 556/46 |
| 6,984,450 B2 | 1/2006 | Menting et al. | 428/402.21 |
| 7,279,517 B2 * | 10/2007 | Mueller et al. | 524/199 |
| 2003/0222023 A1 * | 12/2003 | Mueller et al. | 210/656 |
| 2004/0225134 A1 | 11/2004 | Yaghi et al. | 549/211 |
| 2004/0249189 A1 | 12/2004 | Mueller et al. | 560/112 |
| 2004/0265670 A1 | 12/2004 | Muller et al. | 429/34 |
| 2005/0004404 A1 | 1/2005 | Muller et al. | 568/679 |
| 2005/0124819 A1 | 6/2005 | Yaghi et al. | 556/148 |
| 2005/0154222 A1 | 7/2005 | Muller et al. | 556/118 |
| 2005/0192175 A1 | 9/2005 | Yaghi et al. | 502/1 |
| 2006/0099398 A1 * | 5/2006 | Hesse et al. | 428/312.2 |
| 2006/0287190 A1 * | 12/2006 | Eddaoudi et al. | 502/60 |
| 2007/0062625 A1 * | 3/2007 | Koster et al. | 152/209.5 |
| 2008/0128941 A1 * | 6/2008 | Lopez et al. | 264/172.11 |

FOREIGN PATENT DOCUMENTS

| | | |
|---|---|---|
| EP | 1770121 A1 | 4/2007 |
| WO | 2004/101575 A2 | 11/2004 |

OTHER PUBLICATIONS

European Search Report—Date of Completion Jan. 25, 2008.
Pgs. 3-14, Internet Article, Elsevier Inc., Roswell, *Microporous and Mesoporous Materials*, "Metal-organic frameworks: a new class of porous materials," 2004.

* cited by examiner

*Primary Examiner*—Bernard Lipman
(74) *Attorney, Agent, or Firm*—John D. DeLong

(57) ABSTRACT

The present invention relates to a pneumatic tire including at least one component, said at least one component including a rubber composition, said rubber composition including at least one diene based rubber; and at least one metal organic framework material including divalent zinc and a multidentate organic ligand, wherein the at least one metal organic framework material at least partially incorporates at least one guest additive.

17 Claims, No Drawings

PNEUMATIC TIRE

BACKGROUND OF THE INVENTION

Pneumatic rubber tires are conventionally prepared with at least one component, such as, for example, a rubber tread, which is often a blend of various rubbers and additives including curing agents. The characteristics of the curing agents are a significant factor in determining various properties of a rubber composition with which the curatives are compounded. Conventionally tire tread rubber compositions for example use sulfur, accelerators such as sulfenamides, stearic acid, and zinc oxide to impart the desired cure and performance characteristics. Performance characteristics may include, for example, traction and rolling resistance, among others. Additionally, other additives may be included in the rubber composition as processing aids, antidegradants, reinforcing fillers, coupling agents, and the like.

SUMMARY OF THE INVENTION

The present invention relates to a pneumatic tire comprising at least one component, said at least one component comprising a rubber composition, said rubber composition comprising at least one diene based rubber; and at least one metal organic framework material comprising divalent zinc and a multidentate organic ligand, wherein the at least one metal organic framework material at least partially incorporates at least one guest additive.

DETAILED DESCRIPTION OF THE INVENTION

There is disclosed a pneumatic tire comprising at least one component, said at least one component comprising a rubber composition, said rubber composition comprising at least one diene based rubber; and at least one metal organic framework material comprising divalent zinc and a multidentate organic ligand, wherein the at least one metal organic framework material at least partially incorporates at least one guest additive.

As disclosed in U.S. Pat. Nos. 5,648,508; 6,893,564; 6,930,193; and U.S. Publication 2004/0225134 so-called metal organic framework materials comprise at least one metal ion and at least one bidentate, or multidentate, organic compound which is coordinately bonded to said metal ion, and contain at least one type of micro- and mesopores or micro- or mesopores.

The disclosure of U.S. Pat. No. 6,893,564 and its teaching regarding metal-organic framework materials at Column 2, Line 20, through Column 4, Line 48 is fully incorporated herein by reference and is reproduced substantially as follows.

The metal-organic framework material is as described in, for example, U.S. Pat. No. 5,648,508, EP-A-0 709 253, M. O'Keeffe et al., *J. Sol. State Chem.*, 152 (2000) Page 3 through 20, H. Li et al., *Nature* 402 (1999) Page 276 seq., M. Eddaoudi et al., *Topics in Catalysis* 2 (1999) Pages 105 through 111, B. Chen et al., *Science* 291 (2001) Pages 1021 through 23. An inexpensive way for the preparation of said materials is the subject of DE 10111230.0.

The metal-organic framework materials, as used in the present invention, comprise pores, particularly micro- and/or mesopores. Micropores are defined as being pores having a diameter of 2 nm or below and mesopores as being pores having a diameter in the range of 2 nm to 50 nm, according to the definition given in *Pure Applied Chem.* 45, Page 71 seq., particularly on Page 79 (1976). The presence of the micro- and/or mesopores can be monitored by sorption measurements which determine the capacity of the metal-organic framework materials for nitrogen uptake at 77 K according to DIN 66131 and/or DIN 66134.

For example, a type-I-form of the isothermal curve indicates the presence of micropores [see, for example, Paragraph 4 of M. Eddaoudi et al., *Topics in Catalysis* 9 (1999)]. In a preferred embodiment, the specific surface area, as calculated according to the Langmuir model (DIN 66131, 66134) preferably is above 5 $m^2/g$, further preferred above 10 $m^2/g$, more preferably above 50 $m^2/g$, particularly preferred above 500 $m^2/g$ and may increase into the region above 3000 $m^2/g$.

As to the metal component within the framework material that is to be used according to the present invention, particularly to be mentioned is divalent zinc metal ion $Zn^{2+}$, of interest in the curing of the rubber composition. Further reference herein to metal organic framework materials assumes that the metal ion therein is the divalent zinc ion $Zn^{2+}$.

In addition to the metal salts disclosed in EP-A 0 790 253 and U.S. Pat. No. 5,648,508, other metallic compounds can be used, such as sulfates, phosphates and other complex counter-ion metal salts of the main- and subgroup metals of the periodic system of the elements. Metal oxides, mixed oxides and mixtures of metal oxides and/or mixed oxides with or without a defined stoichiometry are preferred.

As to the at least bidentate (or multidentate) organic compound, which is capable of coordination with the metal ion, in principle all compounds can be used which are suitable for this purpose and which fulfill the above requirements of being at least bidentate. Said organic compound must have at least two centers, which are capable to coordinate the metal ions of a metal salt, particularly with the metals of the aforementioned groups. With regard to the at least bidentate organic compound, specific mention is to be made of compounds having i) an alkyl group substructure, having from 1 to 10 carbon atoms, ii) an aryl group substructure, having from 1 to 5 phenyl rings, iii) an alkyl or aryl amine substructure, consisting of alkyl groups having from 1 to 10 carbon atoms or aryl groups having from 1 to 5 phenyl rings, said substructures having bound thereto at least one bidentate functional group "X", which is covalently bound to the substructure of said compound, and wherein X is selected from the group consisting of $CO_2H$, $CS_2H$, $NO_2$, $SO_3H$, $Si(OH)_3$, $Ge(OH)_3$, $Sn(OH)_3$, $Si(SH)_4$, $Ge(SH)_4$, $Sn(SH)_3$, $PO_3H$, $AsO_3H$, $AsO_4H$, $P(SH)_3$, $As(SH)_3$, $CH(RSH)_2$, $C(RSH)_3$, $CH(RNH_2)_2$, $C(RNH_2)_3$, $CH(ROH)_2$, $C(ROH)_3$, $CH(RCN)_2$, $C(RCN)_3$, wherein R is an alkyl group having from 1 to 5 carbon atoms, or an aryl group consisting of 1 to 2 phenyl rings, and $CH(SH)_2$, $C(SH)_3$, $CH(NH_2)_2$, $C(NH_2)_2$, $CH(OH)_2$, $C(OH)_3$, $CH(CN)_2$ and $C(CN)_3$.

Particularly to be mentioned are substituted or unsubstituted, mono- or polynuclear aromatic di-, tri- and tetracarboxylic acids and substituted or unsubstituted, at least one hetero atom comprising aromatic di-, tri- and tetracarboxylic acids, which have one or more nuclei.

A preferred ligand is 1,3,5-benzene tricarboxylic acid (BCT). Further preferred ligands are ADC (acetylene dicarboxylate), NDC (naphtalene dicarboxylate), BDC (benzene dicarboxylate, also known as terephthalate), ATC (adamantane tetracarboxylate), BTC (benzene tricarboxylate), BTB (benzene tribenzoate), MTB (methane tetrabenzoate) and ATB (adamantane tribenzoate).

Besides the at least bidentate organic compound, the framework material as used in accordance with the present invention may also comprise one or more monodentate ligand(s), which is/are preferably selected from the following monodentate substances and/or derivatives thereof: a) alkyl amines and their corresponding alkyl ammonium salts, containing linear, branched, or cyclic aliphatic groups, having from 1 to 20 carbon atoms (and their corresponding ammonium salts); b) aryl amines and their corresponding aryl ammonium salts having from 1 to 5 phenyl rings; c) alkyl phosphonium salts, containing linear, branched, or cyclic aliphatic groups, having from 1 to 20 carbon atoms; d) aryl phosphonium salts, having from 1 to 5 phenyl rings; e) alkyl organic acids and the corresponding alkyl organic anions (and salts) containing linear, branched, or cyclic aliphatic groups, having from 1 to 20 carbon atoms; f) aryl organic acids and their corresponding aryl organic anions and salts, having from 1 to 5 phenyl rings; g) aliphatic alcohols, containing linear, branched, or cyclic aliphatic groups, having from 1 to 20 carbon atoms; h) aryl alcohols having from 1 to 5 phenyl rings; i) inorganic anions from the group consisting of sulfate, nitrate, nitrite, sulfite, bisulfite, phosphate, hydrogen phosphate, dihydrogen phosphate, diphosphate, triphosphate, phosphite, chloride, chlorate, bromide, bromate, iodide, iodate, carbonate, bicarbonate, and the corresponding acids and salts of the aforementioned inorganic anions; j) ammonia, carbon dioxide, methane, oxygen, ethylene, hexane, benzene, toluene, xylene, chlorobenzene, nitrobenzene, naphthalene, thiophene, pyridine, acetone, 1-2-dichloroethane, methylenechloride, tetrahydrofuran, ethanolamine, triethylamine and trifluoromethylsulfonic acid.

Further details regarding the at least bidentate organic compounds and the monodentate substances, from which the ligands of the framework material as used in the present application are derived, can be taken from EP-A 0 790 253, whose respective content is incorporated into the present application by reference.

In one embodiment, framework materials of the kind described herein, which comprise $Zn^{2+}$ as a metal ion and ligands derived from terephthalic acid as the bidentate compound, are particularly preferred. Said framework materials are known as MOF-5 in the literature.

Further metal ions, at least bidentate organic compounds and mono-dentate substances, which are respectively useful for the preparation of the framework materials used in the present invention as well as processes for their preparation are particularly disclosed in EP-A 0 790 253, U.S. Pat. No. 5,648,508 and DE 10111230.0.

As solvents, which are particularly useful for the preparation of MOF-5, in addition to the solvents disclosed in the above-referenced literature, dimethyl formamide, diethyl formamide and N-methylpyrollidone, alone, in combination with each other or in combination with other solvents may be used. Within the preparation of the framework materials, particularly within the preparation of MOF-5, the solvents and mother liquors are recycled after crystallization in order to save costs and materials.

The pore sizes of the metal-organic framework can be adjusted by selecting suitable organic ligands and/or bidendate compounds (=linkers). Generally, the larger the linker, the larger the pore size. Any pore size that is still supported by a the metal-organic framework in the absence of a host and at temperatures of at least 200° C. is conceivable. Pore sizes ranging from 0.2 nm to 30 nm are preferred, with pore sizes ranging from 0.3 nm to 3 nm being particularly preferred.

Examples of metal-organic framework materials (MOFs) are as given in U.S. Pat. No. 6,893,564, in the table starting at Column 5, Line 1, and continuing to Column 20, Line 31. These specific examples, however, are not meant to limit the generality and scope of the present application. A list of metal-organic framework materials already synthesized and characterized is given therein. This also includes novel isoreticular metal organic framework materials (IR-MOFs), which may be used in the framework of the present application. Such materials having the same framework topology while displaying different pore sizes and crystal densities are described, for example in M. Eddouadi et al., *Science* 295 (2002) 469, which is incorporated into the present application by reference, and in U.S. Pat. No. 6,930,193 and U.S. Publication 2004/0225134, both of which are incorporated by reference into the present application.

Examples for the synthesis of these materials as such can, for example, be found in: *J. Am. Chem. Soc.* 123 (2001) Pages 8241 seq. or in *Acc. Chem. Res.* 31 (1998) Pages 474 seq., which are fully encompassed within the content of the present application with respect to their respective content.

The separation of the framework materials, particularly of MOF-5, from the mother liquor of the crystallization may be achieved by procedures known in the art such as solid-liquid separations, centrifugation, extraction, filtration, membrane filtration, cross-flow filtration, flocculation using flocculation adjuvants (non-ionic, cationic and anionic adjuvants) or by the addition of pH shifting additives such as salts, acids or bases, by flotation, as well as by evaporation of the mother liquor at elevated temperature and/or in vacuo and concentrating of the solid. The material obtained in this step is typically a fine powder and cannot be used for most practical applications, e.g., in catalysis, where shaped bodies are required.

As disclosed in U.S. Publication 2004/0225134, certain metal organic framework materials and isorecticular metal organic framework materials may be exploited to bind so-called guest molecules within the pores of the MOF or IR-MOF. It is now disclosed that certain chemical species may be incorporated into the pores of zinc organic framework materials or isoreticular zinc organic framework materials, such chemical species may include additives typically utilized in rubber compounds for use in tires.

In one embodiment, the zinc organic framework material useful to hose guest additives is an MOF-5 type material. In another embodiment, the zinc organic framework material is an MOF-177 type material as disclosed in U.S. Publication 2004/0225134. In another embodiment, the zinc organic framework material is an isoreticular MOF (IR-MOF) as disclosed in U.S. Pat. No. 6,930,193. As disclosed therein, MOF-177 is a crystalline $Zn_4O(BTB)_2$ (BTB=1,3,5-benzenetribenzoate). A suitable IR-MOF is one having a pore size sufficient to host a given rubber additive, according to the unit size of the additive, such as a molecule, atom, nanoparticle, etc.

In one embodiment, rubber compounding additives that may serve as guest molecules or atoms in MOF or IR-MOF materials may include plasticizers, antidegradants, silane coupling agents, sulfur, vulcanization accelerators, colorants, functionalized oligomers, and the like. The use of MOF or IR-MOF materials as a carrier for such rubber compounding additives may assist in one or more functions during the processing, cure, and use of a rubber compound or tire. Such functions may include but are not limited to assisting in dispersion of the additive during rubber mixing, and controlled release of a rubber additive during rubber mixing, cure, or during use in a tire. In the case of use to aid in dispersion of an additive, the MOF or IR-MOF containing the guest additive may act to carry difficult-to-disperse additives during rubber mixing such that the additive is more uniformly dispersed in the rubber. After mixing, the MOF or IR-MOF may break down due to dissolution or reaction with the rubber or other additives. In the case of use to act as a controlled release carrier, the MOF or IR-MOF containing the guest additive may retain a particular guest additive after mixing in the rubber until such time as it is desirable to expose the additive to the rubber compound environment. The release may be effected by dissolution or reaction of the MOF or IR-MOF.

As disclosed in U.S. Publication 2004/0225134, the ability of a given MOF or IR-MOF to host a guest additives may be dependent on both the pore size in the MOF or IR-MOF, and the size of the intended guest additive. In the case of the dye molecules and as disclosed in U.S. Publication 2004/0225134, the ability of MOF-177 crystals to host large organic guest molecules was therein quantified for the dyes Astrazon Orange, Nile Red, and Reichardt's dye. These incorporated 16, 2 and 1 molecules per unit cell respectively. Slicing the crystals to expose their inner core indicated that for Astrazon Orange and Nile Red, distribution of the guest molecules was observed throughout the crystal while for Reichardt's dye, the presence was primarily restricted to the crystal edges. It is herein contemplated that organic molecules such as those used as additives in rubber compounding may also serve as guest molecules in a zinc organic framework material. The degree of incorporation of a given additive into a zinc organic framework material may depend on the relative size of the additive as compared with the pore size of the given zinc organic framework material. Thus, while not wishing to be bound by any particular theory, it is believed that in hosting guest additive species in a zinc organic framework material, the guest species may be wholly or at least partially incorporated into the pores of the zinc organic framework material. By incorporation, it is meant that the guest additive species may be absorbed to or otherwise associated with the zinc organic framework material such that upon mixing of the zinc organic framework material containing the guest additive species into a rubber compound, the guest additive is dispersed with the zinc organic framework material into the rubber compound. After such mixing, the guest additive may be subsequently at least partially disassociated from the zinc organic framework material, by diffusion, dissolution, chemical reaction, or the like.

For example, in the case of antidegradants, any of the known antioxidants and antiozonants as are known in the rubber compounding art may be included as guest species in the MOF or IR-MOF. Such antidegradants may include but are not limited to p-phenylene diamines, dihydroquinolines, hindered phenols, and the like. It may be desirable, for example, to obtain controlled release of the antidegradants over time to replenish consumed antidegradants in the rubber compound.

In the case of silane coupling agents, such as sulfur containing organosilicon compounds as are described more fully herein, certain of these materials are highly reactive with the rubber owing to their sulfur content, and may react before being fully dispersed during rubber mixing. It may be desirable to include such sulfur containing organosilicon compounds as guest molecules in an MOF or IR-MOF to better disperse the sulfur containing organosilicon compounds in the rubber and avoid undesirable increase in mixing viscosity.

In the case of vulcanization accelerators, certain accelerators are known to be highly reactive and their use in some rubber compounding applications may lead to scorching of the rubber compound. It may be desirable to include such accelerators as guest molecules in an MOF or IR-MOF to retain the accelerator in an unreactive form as a guest molecule, with subsequent release into the rubber compound upon dissolution or reaction of the MOF or IR-MOF. Upon release, the accelerator would then be available for utilization in the curing reaction of the rubber.

In one embodiment, inclusion of the guest additive into the zinc organic framework material may be accomplished via diffusion of the additive from a solution containing the additive and the zinc organic framework material. Thus, for example, the additive may be incorporated into the zinc organic framework material as is disclosed in US Publication 2004/0225134, wherein it is disclosed that organic dye molecules are incorporated into MOF-177 via uptake of the dye into the MOF-177 by exposing the MOF-177 crystals to a saturated dye solution in $CH_2Cl_2$.

In one embodiment, about 0.1 to 50 phr of zinc organic framework material is present in the rubber component of the tire. In another embodiment, from about 0.5 to about 20 phr of zinc organic framework material is present in the rubber component of the tire. Some or all of the zinc organic framework material may include guest additives as described herein, following the general description herein as to the appropriate amount of the given additive in the rubber compound.

In addition to the zinc organic framework material, the rubber component contains at least one rubber containing olefinic unsaturation. The phrases "rubber or elastomer containing olefinic unsaturation" or "diene based rubbers" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are natural rubber, synthetic polyisoprene, polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/ acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The rubber composition may optionally include from 0 to about 20 phr of 3,4-polyisoprene rubber. The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, napthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the EP346 method may be found in *Standard Methods for Analysis & Testing of Petroleum and Related Products* and *British Standard* 2000 *Parts,* 2003, 62nd edition, published by the Institute of Petroleum, United Kingdom.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials, and such terms are well known to those having skill in the rubber mixing or rubber compounding art.

The vulcanizable rubber composition may include from about 10 to about 150 phr of silica.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z165MP and Z165GR and silicas available from Degussa AG with, for example, designations VN2 and VN3, etc.

The vulcanizable rubber composition may include from 1 to 150 phr of carbon black.

Commonly employed carbon blacks can be used as a conventional filler. Representative examples of such carbon blacks include N110, N121, N134, N220, N231, N234, N242, N293, N299, N315, N326, N330, M332, N339, N343, N347, N351, N358 N375, N539, N550, N582, N630, N642, N650, N683, N754, N762, N765, N774, N787 N907, N908, N990 and N991. These carbon blacks have iodine absorptions ranging from 9 to 145 g/kg and DBP number ranging from 34 to 150 cm³/100 g.

Other fillers may be used in the rubber composition including, but not limited to, particulate fillers including ultra high molecular weight polyethylene (UHMWPE), particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639.

In one embodiment the rubber composition for use in the tire tread may contain a conventional sulfur containing organosilicon compound. Examples of suitable sulfur containing organosilicon compounds are of the formula:

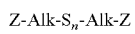

in which Z is selected from the group consisting of

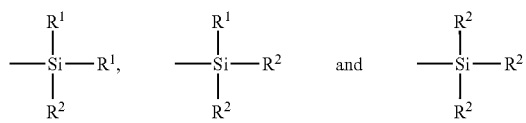

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl)sulfides. In one embodiment, the sulfur containing organosilicon compounds are 3,3'-bis(triethoxysilylpropyl)disulfide and 3,3'-bis(triethoxysilylpropyl)tetrasulfide. Therefore, as to formula I, Z may be

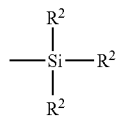

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from GE Silicones.

In another embodiment, suitable sulfur containing organosilicon compounds include those disclosed in U.S. Patent Publication 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr. Some or all of the sulfur containing organosilicon compound may be included as a guest additive in the zinc organic framework material.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Some or all of the additives mentioned may be included as a guest additive in the zinc organic framework material. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr; however, to reduce the amount of total zinc in the compound lesser amounts or none may be used. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Some or all of the accelerator or accelerators may be included as a guest additive in the zinc organic framework material. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). Zinc organic framework material containing guest additives may be added during nonproductive or productive stages or both as is necessary to obtain the desired mixing effects. The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread. In another embodiment, the component is a sidewall insert.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising at least one component, said at least one component comprising a rubber composition, said rubber composition comprising
   at least one diene based rubber; and
   at least one metal organic framework material comprising divalent zinc and a multidentate organic ligand, wherein the at least one metal organic framework material comprises at least one guest additive at least partially incorporated into the at least one metal organic framework material.

2. The pneumatic tire of claim 1, wherein the at least one guest additive is selected from plasticizers, antidegradants, silane coupling agents, sulfur, vulcanization accelerators, functionalized oligomers, and colorants.

3. The pneumatic tire of claim 1 wherein the at least one guest additive comprises a silane coupling agent, and wherein the silane coupling agent is a sulfur containing organosilicon compound.

4. The pneumatic tire of claim 1 wherein the at least one guest additive comprises a silane coupling agent, and wherein the silane coupling agent is a sulfur containing organosilicon compound of the formula:

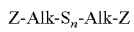

in which Z is selected from the group consisting of

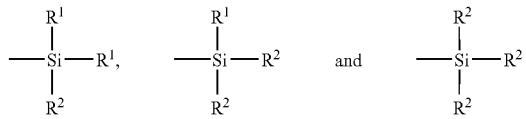

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

5. The pneumatic tire of claim 1 wherein the at least one guest additive comprises at least one antidegradant selected from p-phenylene diamines, dihydroquinolines, and hindered phenols.

6. The pneumatic tire of claim 1 wherein the at least one guest additive comprises at least one vulcanization accelerator selected from amines, disulfides, guanidines, thioureas, thiazoles, thiurams, sulfenamides, dithiocarbamates and xanthates.

7. The pneumatic tire of claim 1 wherein the at least one guest additive comprises sulfur.

8. The pneumatic tire of claim 1 wherein the at least one metal organic framework material is MOF-5.

9. The pneumatic tire of claim 1 wherein the at least one metal organic framework material is MOF-177.

10. The pneumatic tire of claim 1 wherein the at least one metal organic framework material is an isoreticular metal organic framework material (IR-MOF).

11. The pneumatic tire of claim 1 wherein the multidentate organic ligand is selected from substituted or unsubstituted, mono- or polynuclear aromatic di-, tri- and tetracarboxylic acids and substituted or unsubstituted, at least one hetero atom comprising aromatic di-, tri- and tetracarboxylic acids, which have one or more nuclei.

12. The pneumatic tire of claim 1 wherein the multidentate ligand is selected from the group consisting of benzenedicarboxylate, 1,3,5-benzene tricarboxylic acid, acetylene dicarboxylate, naphtalene dicarboxylate, adamantane tetracarboxylate, benzene tricarboxylate, 1,3,5-benzene tribenzoate, methane tetrabenzoate, and adamantane tribenzoate.

13. The pneumatic tire of claim 1 wherein the multidentate organic ligand is 1,4-benzenedicarboxylate.

14. The pneumatic tire of claim 1 wherein the multidentate organic ligand is 1,3,5-benzenetribenzoate.

15. The pneumatic tire of claim 1 wherein the rubber composition comprises
    100 parts by weight of said at least one diene based rubber; and
    from 0.1 to 50 parts by weight of said at least one metal organic framework material.

16. The pneumatic tire of claim 1 wherein the at least one diene based rubber is selected from the group consisting of polychloroprene, polybutadiene, polyisoprene, butyl rubber, chlorobutyl rubber, bromobutyl rubber, styrene/isoprene/ butadiene rubber, copolymers of 1,3-butadiene with styrene, copolymers of 1,3-butadiene with acrylonitrile, copolymers of 1,3-butadiene with methyl methacrylate, copolymers of isoprene with styrene, copolymers of isoprene with acrylonitrile, and copolymers of isoprene with methyl methacrylate.

17. The pneumatic tire of claim 6 wherein the rubber composition comprises from 0.5 to 20 parts by weight of said at least one metal organic framework material.

* * * * *